US011399268B2

(12) United States Patent
Ahmed et al.

(10) Patent No.: US 11,399,268 B2
(45) Date of Patent: Jul. 26, 2022

(54) TELEMATICS OFFLOADING USING V2V AND BLOCKCHAIN AS TRUST MECHANISM

(71) Applicant: Toyota Motor North America, Inc., Plano, TX (US)

(72) Inventors: Hazem Ahmed, Plano, TX (US); David M. Goemer, Frisco, TX (US); Walter Accessor, Little Elm, TX (US); Andrew L. Wells, Denton, TX (US); Ryan Wheeler, Denton, TX (US); Anil R. Nair, Plano, TX (US); Senthilkumar Gopal Kalaimani, Frisco, TX (US); Neil Dutta, Addison, TX (US); Michael C. Edwards, McKinney, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 607 days.

(21) Appl. No.: 16/355,564

(22) Filed: Mar. 15, 2019

(65) Prior Publication Data
US 2020/0296559 A1   Sep. 17, 2020

(51) Int. Cl.
*H04W 4/46*  (2018.01)
*G07C 5/08*  (2006.01)
(Continued)

(52) U.S. Cl.
CPC .............. *H04W 4/46* (2018.02); *G07C 5/008* (2013.01); *G07C 5/0841* (2013.01);
(Continued)

(58) Field of Classification Search
CPC ........ H04W 4/46; H04W 4/80; H04L 9/3239; H04L 9/0637; H04L 2209/84;
(Continued)

(56) References Cited

U.S. PATENT DOCUMENTS

| 9,525,556 B2 | 12/2016 | Park et al. |
| 9,988,058 B2 | 6/2018 | Phillips |

(Continued)

OTHER PUBLICATIONS

CyberCar Whitepaper; http://www.cybercar.io/; 10 pages; Jul. 24, 2018.
(Continued)

*Primary Examiner* — Taghi T Arani
*Assistant Examiner* — Blake I Narramore
(74) *Attorney, Agent, or Firm* — Snell & Wilmer LLP

(57) ABSTRACT

Methods and systems for maintaining telematics data. The system includes a standard vehicle. The standard vehicle includes one or more sensors configured to detect telematics data, a memory configured to store a blockchain associated with the standard vehicle, an electronic control unit (ECU) configured to update the blockchain associated with the standard vehicle with the detected telematics data, and a transceiver configured to communicate the blockchain to one or more other vehicles. The system also includes a collection vehicle. The collection vehicle includes a transceiver configured to receive the blockchain from the standard vehicle, and communicate the blockchain from the standard vehicle to a network to update a distributed record of the blockchain associated with the standard vehicle.

14 Claims, 14 Drawing Sheets

(51) Int. Cl.
  *G07C 5/00* (2006.01)
  *H04L 9/06* (2006.01)
  *H04L 9/32* (2006.01)
  *H04W 4/80* (2018.01)
  *G06F 21/64* (2013.01)

(52) U.S. Cl.
  CPC .......... *H04L 9/0637* (2013.01); *H04L 9/3239* (2013.01); *G06F 21/64* (2013.01); *H04L 2209/38* (2013.01); *H04L 2209/84* (2013.01); *H04W 4/80* (2018.02)

(58) Field of Classification Search
  CPC ... H04L 2209/38; G07C 5/0841; G07C 5/008; G06F 21/64
  See application file for complete search history.

(56) References Cited

U.S. PATENT DOCUMENTS

| | | | | |
|---|---|---|---|---|
| 10,414,407 | B1* | 9/2019 | Slusar | B60W 40/09 |
| 10,721,274 | B1* | 7/2020 | Prasad | H04L 41/145 |
| 10,949,926 | B1* | 3/2021 | Call | G06Q 40/08 |
| 11,301,936 | B1* | 4/2022 | Leise | G06Q 40/08 |
| 2014/0025955 | A1 | 1/2014 | Bodin et al. | |
| 2015/0264017 | A1 | 9/2015 | Saed et al. | |
| 2016/0093216 | A1* | 3/2016 | Lee | G06Q 50/30 340/870.11 |
| 2017/0352185 | A1 | 12/2017 | Bonilla Acevedo et al. | |
| 2018/0091596 | A1* | 3/2018 | Alvarez | H04L 67/12 |
| 2018/0183610 | A1 | 6/2018 | Kravitz et al. | |
| 2019/0007484 | A1* | 1/2019 | Chen | H04W 4/40 |
| 2019/0287140 | A1* | 9/2019 | Arora | G06Q 30/0278 |
| 2020/0151974 | A1* | 5/2020 | Ghosh | G07C 5/0866 |
| 2020/0184404 | A1* | 6/2020 | Mezaael | H04L 9/0643 |
| 2021/0264531 | A1* | 8/2021 | Leise | G06Q 40/08 |
| 2021/0342946 | A1* | 11/2021 | Leise | H04L 9/3239 |

OTHER PUBLICATIONS

Carbrain—Teigrated AI & Blockchain in the Carputer; http://www.link-motion.com; 26 pages; Jul. 24, 2018.
Singh et al. "Blockchain Based Intelligent Vehicle Data Sharing Framework"; 4 pages; Jul. 20, 2017.
Carblox Whitepaper ver. 3.1.2; www.carblox.io; 30 pages; Aug. 29, 2017.
Van der Heijden et al. Blockchain: Scalability for Resource-Constrained Accountable Vehicle-to-X Communication; *SERIAL '17 Dec. 11-15, 17, 2017*, 5 pages; Dec. 11, 2017.
Leonard "Blockchain for Transportation: Where the Future Starts"; 14 pages; 2017.
Kruger et al. "Truck Platooning: Towards Future Business Models"; MKWI 2018; 19 pages; Mar. 8, 2018.
Cebe et al. "Block4Forensic: An Integrated Lightweight Blockchain Framework for Forensics Applications of Connected Vehicles" IEEE Communications Magazine; vol. 56; No. 10; pp. 50-57; Oct. 16, 2018.

* cited by examiner

TELEMATICS OFFLOADING USING V2V AND BLOCKCHAIN AS TRUST MECHANISM

BACKGROUND

1. Field

This specification relates to a system and a method for transmitting vehicle telematics.

2. Description of the Related Art

A vehicle may contain any number of sensors configured to detect any number of respective types of data. For example, a vehicle may have an odometer for measuring vehicle distance travelled or a global positioning system (GPS) sensor for determining the location of the vehicle. In a modern, computerized society, data associated with an individual has become important to companies and governments. Accordingly, the monetary value associated with this data has risen. As the importance and value of data continues to increase, so does the importance of protecting privacy rights of the individuals with whom the data is associated.

SUMMARY

What is described is a system for maintaining telematics data. The system includes a standard vehicle. The standard vehicle includes one or more sensors configured to detect telematics data, a memory configured to store a blockchain associated with the standard vehicle, an electronic control unit (ECU) configured to update the blockchain associated with the standard vehicle with the detected telematics data, and a transceiver configured to communicate the blockchain to one or more other vehicles. The system also includes a collection vehicle. The collection vehicle includes a transceiver configured to receive the blockchain from the standard vehicle, and communicate the blockchain from the standard vehicle to a network to update a distributed record of the blockchain associated with the standard vehicle.

Also described is a vehicle for collecting telematics data. The vehicle includes one or more sensors configured to detect telematics data. The vehicle also includes a memory configured to store a blockchain associated with the vehicle. The vehicle also includes an electronic control unit (ECU) configured to update the blockchain associated with the vehicle with the detected telematics data. The vehicle also includes a transceiver configured to receive a blockchain from another vehicle and communicate the blockchain from the vehicle and the received blockchain to a network to update a distributed record of the blockchain associated with the vehicle and a distributed record of the received blockchain.

Also described is a method for maintaining telematics data. The method includes storing, by a memory of a first vehicle, a blockchain associated with the first vehicle. The method includes detecting, by one or more sensors of the first vehicle, telematics data. The method includes updating, by an electronic control unit (ECU) of the first vehicle, the blockchain associated with the first vehicle with the detected telematics data. The method includes communicating, by a transceiver of the first vehicle, the blockchain associated with the first vehicle to one or more other vehicles. The method includes receiving, by a transceiver of a second vehicle, the blockchain associated with the first vehicle. The method includes communicating, by the transceiver of the second vehicle, the blockchain associated with the first vehicle, to a network to update a distributed record of the blockchain associated with the first vehicle.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, vehicles, and methods for maintaining telematics data. Data has increasingly become more valuable, as data is being used in many applications, from marketing to politics. Accordingly, telematics data is becoming increasingly more valuable. Location data of a collection of vehicles may be used by a company to determine the driving habits of males between the ages of 18 and 25 on weeknights in July, for example. These driving habits may be used to strategically place advertisements along freeways. In another example, the fuel efficiency data of a collection of vehicles may be used by a municipality to determine the average fuel efficiency of vehicles within the geographic boundaries of the municipality, for emissions regulations purposes.

However, there are no suitable systems in place for efficiently and effectively transferring telematics data from the vehicles that collect them to the entities interested in the data. Further, there are no suitable systems in place for transferring telematics data in an open and trusted manner. Thus, there is a need for systems and methods for transferring telematics data.

The systems and methods described herein disclose a decentralized architecture for collecting, storing, and transmitting telematics data, as well as ensuring the validity of the telematics data. As used herein, telematics data may refer to any data associated with a vehicle, roads that vehicles travel on, communication between vehicles, and users of the vehicles.

The systems and methods described herein include collection vehicles and standard (or "detection" or "network-independent") vehicles. While both the collection vehicles and the standard vehicles detect telematics data and locally store the detected telematics data, the standard vehicles do not update the blockchain by uploading the telematics data. Instead, the standard vehicles communicate their telematics data to a collection vehicle, which updates respective blockchains with the telematics data of the standard vehicle and the collection vehicle. In this way, the standard vehicles, which may not have access to efficient or affordable data transmission networks, only have to communicate directly with the collection vehicles, but the telematics data of the standard vehicles are still reflected in the blockchain.

Figure 1:
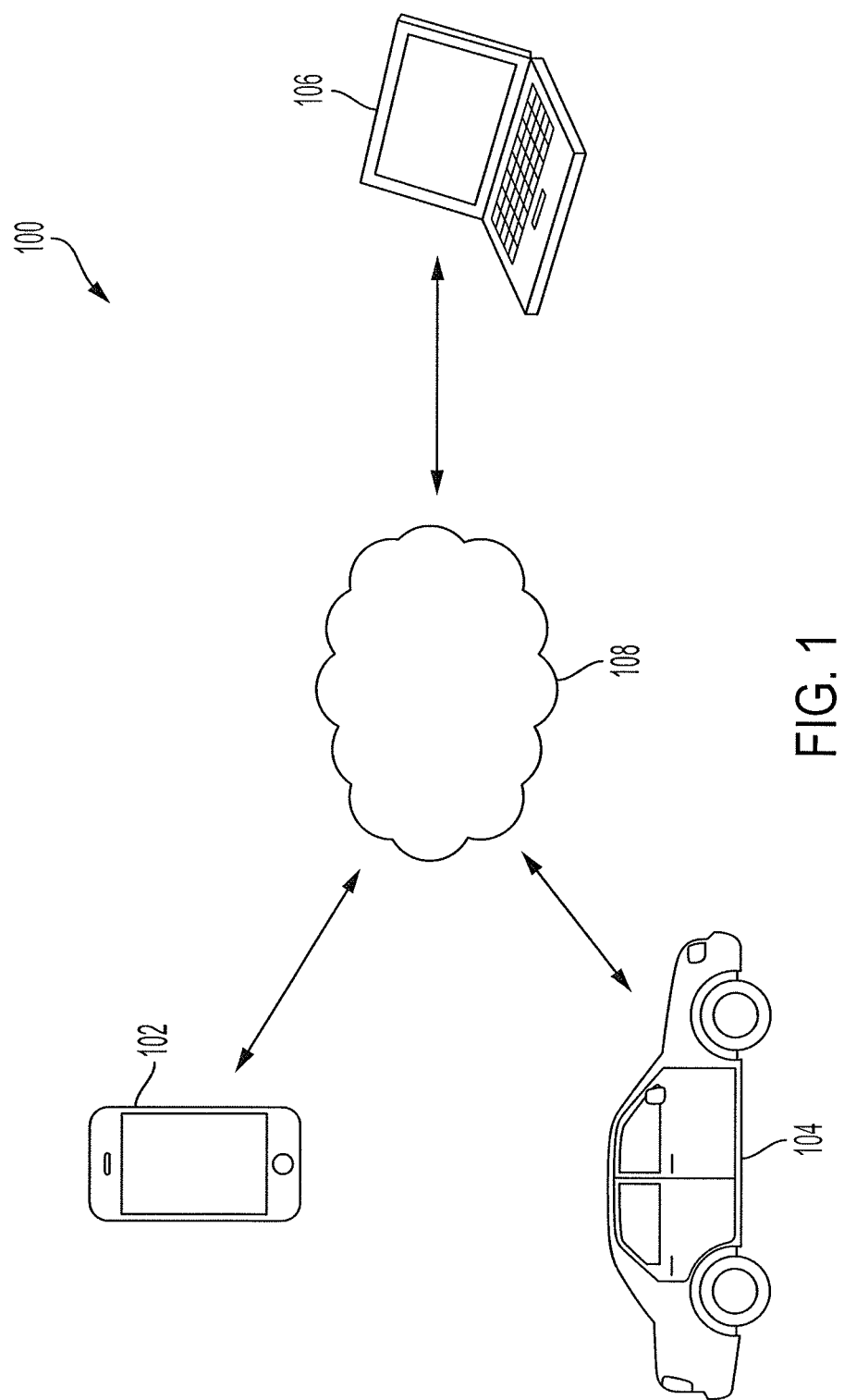
FIG. 1 is a block diagram illustrating a distributed ledger system, according to various embodiments of the invention.

FIG. 1 is a block diagram illustrating a distributed ledger (e.g., blockchain) system 100. The system 100 includes one or more computing devices, such as a smartphone 102, a vehicle 104, or a computer 106, for example. The computing devices 102, 104, and 106 are associated with one or more distributed ledgers. The computing devices 102, 104, and 106 may be associated with vehicle owners, companies, vehicle manufacturers, or vehicle service providers, for example. The computing devices 102, 104, and 106 may maintain and/or update the ledgers. Each computing device 102, 104, and 106 may be configured to store a version of the distributed ledger. Each computing device 102, 104, and 106 may update the ledger by adding ledger entries or updating existing ledger entries.

A distributed ledger may be represented on a blockchain. The use of storing a record on a distributed ledger allows for other entities to check, verify, and/or validate the record placed on the distributed ledger. Moreover, the distributed ledger functions as an immutable record of the recorded information. The immutable record prevents others from tampering with, modifying or deleting any of the records on the distributed ledger.

The computing devices 102, 104, and 106 may be connected to each other and/or to other computing devices via the network 108. A ledger may be stored on a plurality of computing devices, each acting as a node in a distributed architecture for storing a copy of the ledger. In this way, the ledger is collaboratively maintained (possibly anonymously) by any number of computing devices on a network. In some embodiments, the ledger is stored and maintained on a set of trusted computing devices such as the computing devices of authorized users. In some embodiments, a combination of both trusted computing devices and non-verified computing devices are used. In these embodiments, the same or different rules may be applied based on whether the computing device is a trusted computing device or a non-verified computing device. In some embodiments, there may be different levels of nodes with different trust and validation levels.

The ledgers, ledger entries, and/or information stored on the ledger entries may be used for recording telematics data, which may include location data, fuel data, entertainment data, driving pattern data, and interactions between vehicles, for example.

In some embodiments, the ledger is publicly accessible to any computing device. In some embodiments, the ledger is only accessible to authorized computing devices providing the corresponding authentication credentials. In some embodiments, portions of the ledger are public and portions of the ledger are private. When the ledger is publicly accessible, the ledger may be configured so that identifiable information is removed but validation information is maintained. For example, a hash value generated based on particular data may be accessible on the ledger so that the data may be validated, but any identifiable information is obscured.

Figure 2:
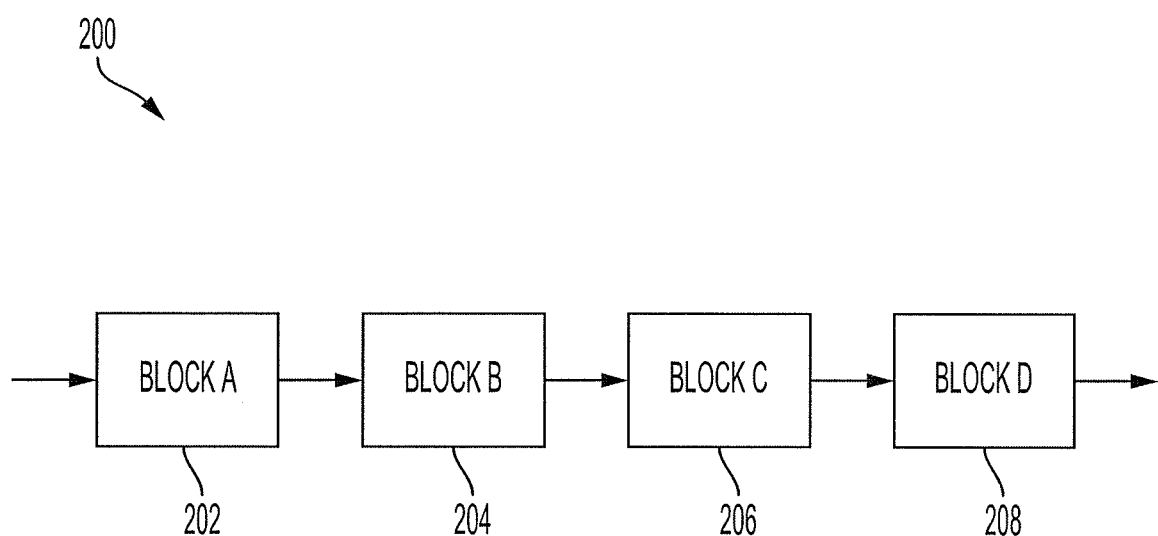
FIG. 2 illustrates a blockchain that may be used in the systems described herein, according to various embodiments of the invention.

FIG. 2 illustrates a blockchain 200 that may be used in the systems described herein. The blockchain 200 includes Block A 202, Block B 204, Block C 206, and Block D 208. In some embodiments, the blockchain 200 is associated with one particular vehicle. In other embodiments, the blockchain 200 is associated with one particular user, such as in situations where transportation is provided as a service, and the user may use any number of different vehicles for transportation.

Each block may include an identifier associated with the vehicle or the user. Each block may also include a time and date indicator identifying when the block was created. When blocks are linked, as the blocks 202-208 are, the blocks may be linked by a hash value based on the contents of the block(s), so that if the block(s) were ever tampered with, the corresponding hash value would change, and the once-connected blocks would no longer be connected. In this way, the hash value connection between the blocks facilitates prevention of changing of the values of the blocks.

Blocks may be created whenever an event occurs. For example, when the blockchain 200 is associated with a vehicle, Block A 202 may be created when the vehicle is manufactured, and Block A may include the vehicle details, such as make, model, vehicle identification number (VIN), color, manufacturing location, and manufacture date, for example. In the example, Block B 204 may be created when the vehicle is sold or leased, and Block B may include new owner information, previous owner information, cost of the vehicle, lender information, and mileage of the vehicle when sold, for example. Block C 206 may be created when the vehicle is driven from one place to another, and Block C may include the location of the first place and the location of the second place, as well as travel time and travel distance, for example. Block D 208 may be created when a vehicle routine is determined, such as a morning and evening commute, for example.

In another example, when the blockchain 200 is associated with a user who uses transportation as a service (e.g., ride sharing, taxi, or limousine), Block A 202 may be created when a user account associated with the user is created, and Block A 202 may include the user's name, the location of the user, billing information of the user, address of the user, and demographic information of the user, for example. In the example, Block B 204 may be created when the user takes a first trip from one place to another, and Block B may include the start location and destination of the first trip, as well as travel time and travel distance, for example. Block C 206 may be created when the user adds a favorite location to the user's list of frequently traveled destinations. Block D 208 may be created when a user's routine is determined, such as a morning and evening commute, for example.

Figure 3A:
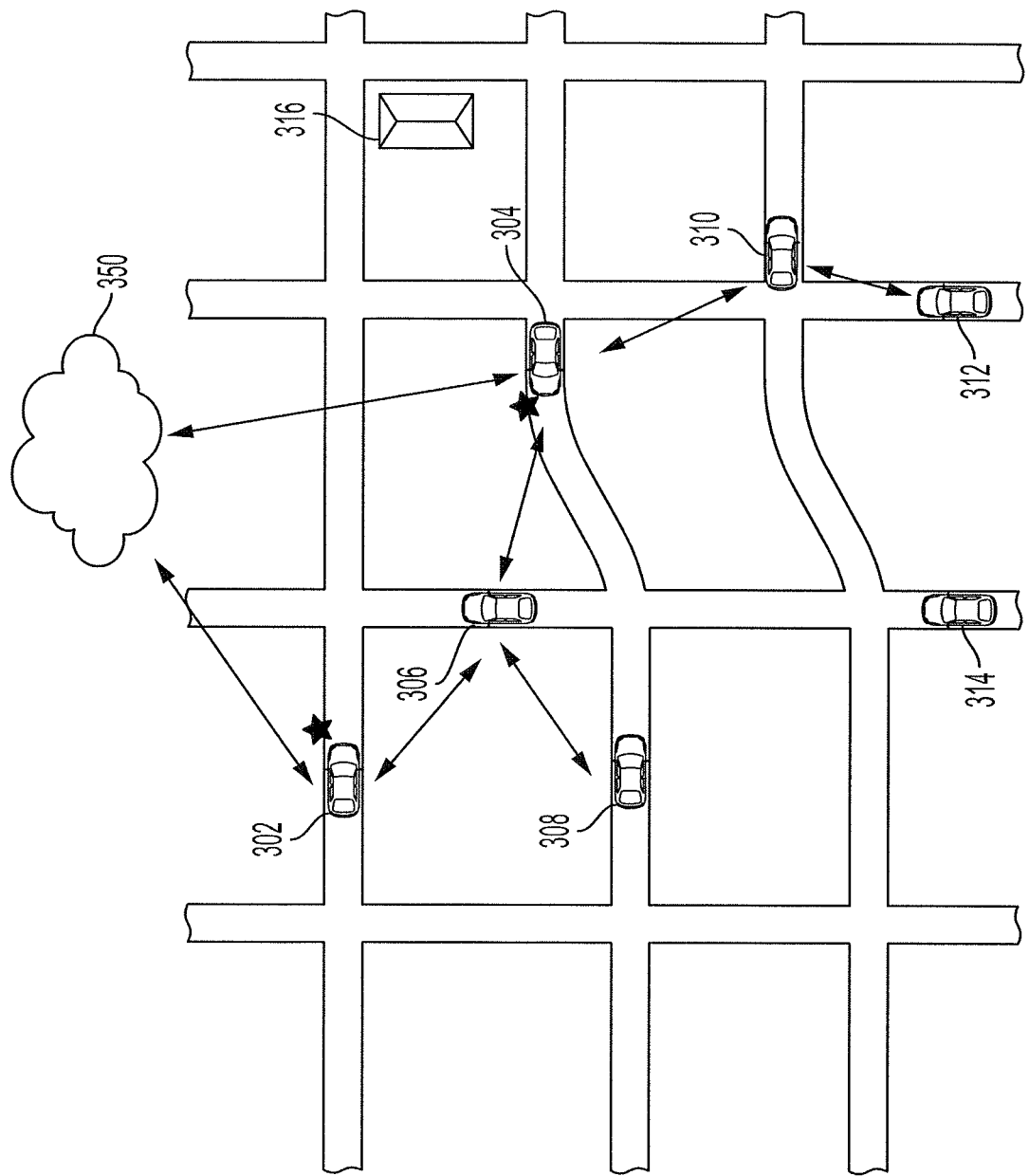
FIGS. 3A-3B illustrate use of collection vehicles for transmitting vehicle telematics, according to various embodiments of the invention.
Figure 3B:
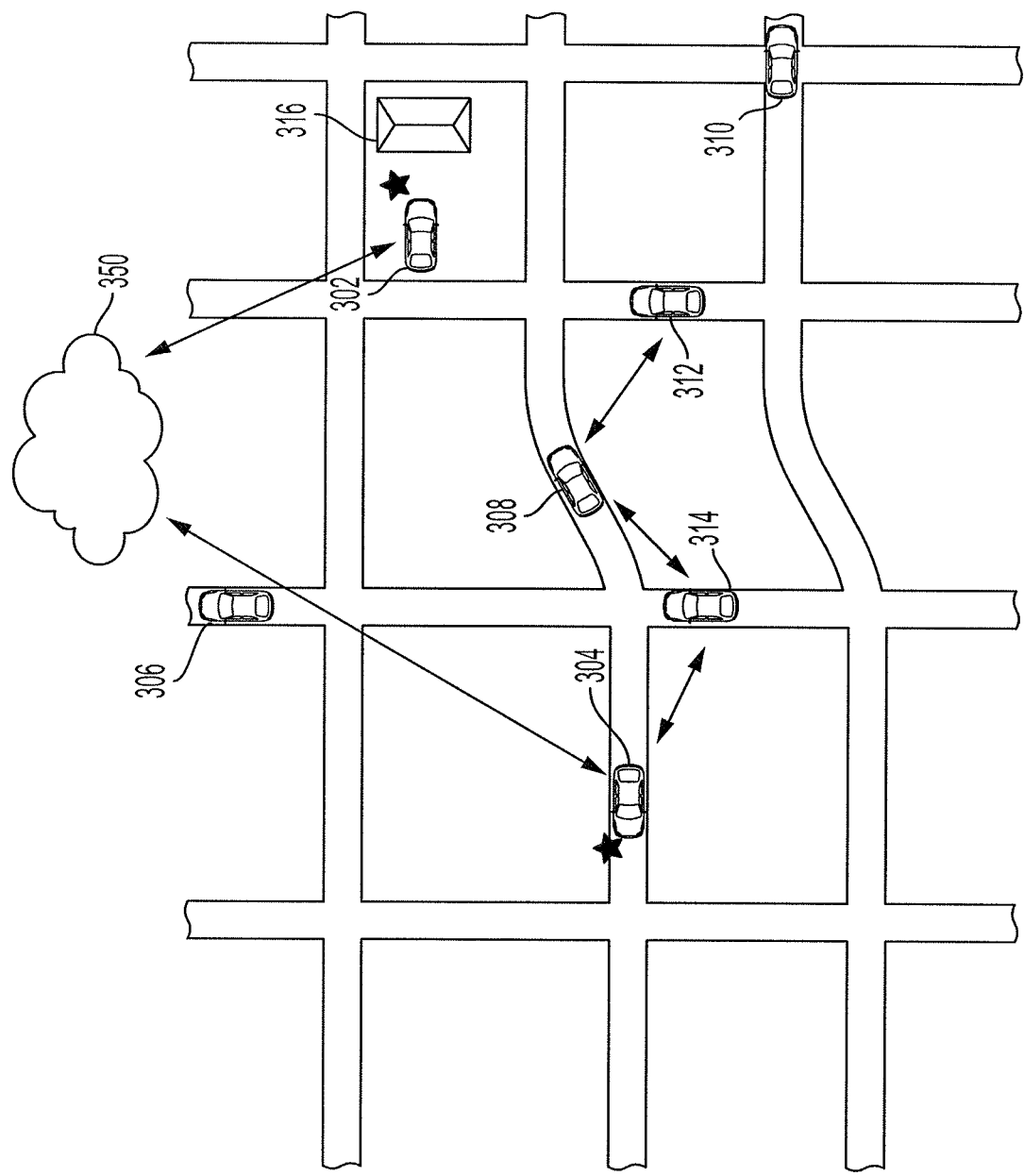

FIGS. 3A-3B illustrate use of collection vehicles for transmitting vehicle telematics. A first vehicle 302 and a second vehicle 304 are collection vehicles (or "node vehicles" or "active nodes"). These vehicles receive telematics data from standard vehicles and upload the received telematics data. The first vehicle 302 and the second vehicle 304 are capable of transmitting data to a network 350, such as the Internet, from any location. In some embodiments, the collection vehicles have access to more efficient and more cost-effective channels for transmitting and receiving data to the network 350, as compared to standard vehicles.

A third vehicle 306, fourth vehicle 308, fifth vehicle 310, sixth vehicle 312, and seventh vehicle 314 are standard vehicles. These standard vehicles and the collection vehicles both detect telematics data and locally store the detected telematics data in data storage. However, these standard vehicles do not communicate with the network 350, at least for the purposes of transmitting telematics data. Instead, these standard vehicles communicate their telematics data to the collection vehicles (e.g., first vehicle 302 and second vehicle 304) and the collection vehicles transmit the telematics data of the standard vehicles on the standard vehicles' behalf.

All of the vehicles 302-314 are capable of direct vehicle to vehicle communications. However, this direct vehicle to vehicle communications may be limited by distance. Thus, as shown in FIG. 3A, the first vehicle 302 is only capable of communicating with the third vehicle 306 and the fourth vehicle 308. Similarly, the third vehicle 306 is only capable of communicating with the second vehicle 304 and the fourth vehicle 308; the second vehicle 304 is only capable of communicating with the fifth vehicle 310; the fifth vehicle is only capable of communicating with the second vehicle 304 and the sixth vehicle 312; and the sixth vehicle 312 is only capable of communicating with the fifth vehicle 310. The seventh vehicle 314 is not within range of any other vehicles, and thus unable to communicate with any other vehicles.

All of the vehicles 302-314 may detect telematics data. When the standard vehicles 306-314 are within range of another vehicle, telematics data is communicated. For example, when the fourth vehicle 308 is within range of the third vehicle 306, the fourth vehicle 308 communicates its telematics data to the third vehicle 306. The third vehicle 306 stores the fourth vehicle telematics data as well as its own third vehicle telematics data. The third vehicle 306 is within range of the first vehicle 302, which is a collection vehicle. The third vehicle 306 communicates its own third vehicle telematics data as well as the fourth vehicle telematics data to the first vehicle 302. The first vehicle 302 is now in possession of the third vehicle telematics data, the fourth vehicle telematics data, and its own first vehicle telematics data.

In some embodiments, the first vehicle 302 communicates the third vehicle telematics data, the fourth vehicle telematics data, and its own first vehicle telematics data to the network 350, to update the telematics data of the respective vehicles. In other embodiments, the first vehicle 302 stores all received telematics data until the first vehicle 302 reaches a location where it may communicate the collected telematics data in an efficient and/or cost-effective manner. As shown in FIG. 3B, the first vehicle 302 may, at a later time, be located at the home 316 of the owner of the first vehicle 302. At the home 316, there may be a local network connection (e.g., Wi-Fi) that is connected to the network 350 that is faster and more cost-effective than transmitting data using the transceiver of the first vehicle 302 to directly communicate data to the network 350. The first vehicle 302 then communicates the collected telematics data (the first vehicle telematics data, the third vehicle telematics data, and the fourth vehicle telematics data) to the network 350 via the network connection at home 316. In this way, even though the fourth vehicle 308 is not within range of any collection vehicles, the fourth vehicle telematics data may still be communicated to the network 350.

The fourth vehicle 308 may continue to communicate its telematics data to any vehicles in range. For example, as shown in FIG. 3B, the fourth vehicle 308 may communicate its telematics data to the second vehicle 304 via the seventh vehicle 314. The second vehicle 304 is a collection vehicle and may communicate all received telematics data to the network 350 in a similar manner as described with respect to the first vehicle 302. By distributing telematics data to as many vehicles as possible, the distributed network of standard vehicles and collection vehicles may communicate the telematics data of all of the vehicles to the network 350 in an expedient and efficient manner.

Figure 4:
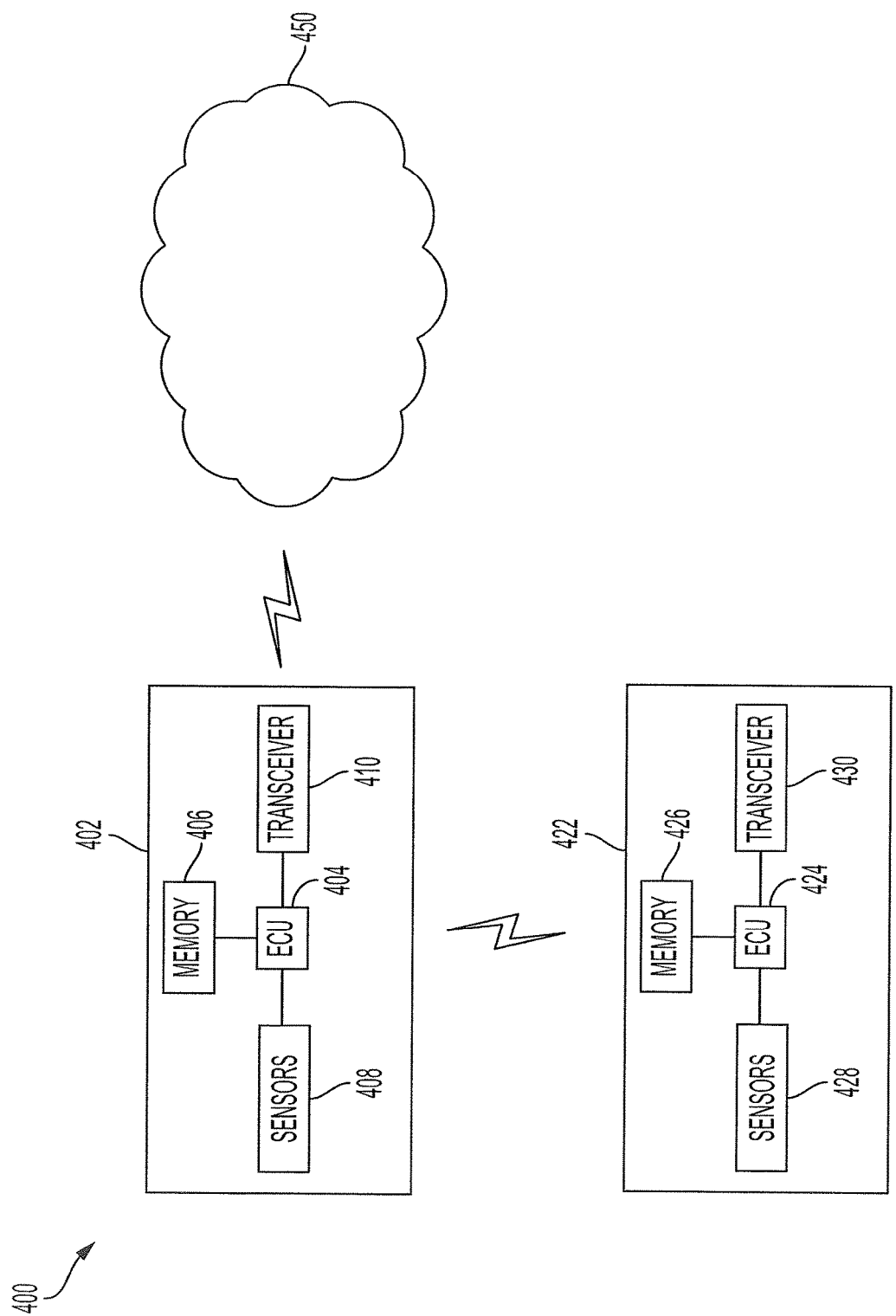
FIG. 4 illustrates a block diagram of interactions between components of the system, according to various embodiments of the invention.

FIG. 4 illustrates an example system 400, according to various embodiments of the invention. The system 400 includes a collection vehicle 402 (e.g., collection vehicles 302-304) and a standard vehicle 422 (e.g., standard vehicles 306-314). Each of the collection vehicle 402 and the standard vehicle 422 may be associated with a respective vehicle identification or identifier. A distributed ledger (e.g., blockchain 200) may be associated with the vehicle identification or identifier. Thus, the collection vehicle 402 is associated with a first distributed ledger and the standard vehicle 422 is associated with a second distributed ledger.

The vehicles 402 or 422 may have automatic or manual transmission. The vehicles 402 or 422 are a conveyance capable of transporting a person, an object, or a permanently or temporarily affixed apparatus. The vehicles 402 or 422 may be a self-propelled wheeled conveyance, such as a car, a sports utility vehicle, a truck, a bus, a van or other motor or battery driven vehicle. For example, the vehicles 402 or 422 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicles 402 or 422 may be a semi-autonomous vehicle or an autonomous vehicle. That is, the vehicles 402 or 422 may be self-maneuvering and navigate without human input. An autonomous vehicle may use one or more sensors and/or a navigation unit to drive autonomously.

The collection vehicle 402 includes one or more computers or electronic control units (ECUs) 404, appropriately programmed, to control one or more operations of the vehicle. The one or more ECUs 404 may be implemented as a single ECU or in multiple ECUs. The ECU 404 may be electrically coupled to some or all of the components of the vehicle. In some embodiments, the ECU 404 is a central ECU configured to control one or more operations of the entire vehicle. In some embodiments, the ECU 404 is multiple ECUs located within the vehicle and each configured to control one or more local operations of the vehicle. In some embodiments, the ECU 404 is one or more computer processors or controllers configured to execute instructions stored in a non-transitory memory 406.

The collection vehicle 402 includes one or more sensors 408 configured to detect various sensor data. The one or more sensors 408 may include a location sensor configured to detect location data associated with the collection vehicle 402. The location sensor may be a GPS unit, and the location data may be in the format of latitude and longitude coordinates. The one or more sensors 408 may include a fuel sensor configured to detect fuel data. The fuel may be a combustible gasoline or may be electrical charge stored in a battery. The fuel data may indicate a remaining amount of fuel, a remaining percentage of fuel, and/or a maximum storable amount of fuel. The one or more sensors 408 may include an image sensor such as a camera configured to detect image data. The image data may show objects in the vicinity of the vehicle, road condition, or traffic conditions, for example. The one or more sensors 408 may include a speed sensor configured to detect speed data of the vehicle. The one or more sensors 408 may include an accelerator pedal sensor configured to detect an engagement of the accelerator pedal. The one or more sensors 408 may include a brake pedal sensor configured to detect an engagement of the brake pedal. The one or more sensors 408 may include an inertial measurement unit (IMU) configured to detect orientation data of the vehicle and/or acceleration/deceleration of the vehicle. The one or more sensors 408 may include a steering wheel sensor configured to detect steering wheel data indicating an amount the steering wheel is turned and/or a rate at which it is turned. The one or more sensors 408 may include a seat belt sensor configured to detect whether one or more seat belts of the vehicle are engaged. The one or more sensors 408 may include an airbag sensor configured to detect whether one or more airbags in the vehicle have deployed.

The collection vehicle 402 may also include a transceiver 410. The transceiver 410 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The transceiver 410 may transmit data to and receive data from devices and systems not directly connected to the collection vehicle 402. The transceiver 410 may access the network 450. The transceiver 410 may also be used to communicate with other vehicles, such as standard vehicle 422. The vehicles may utilize digital short-range communication (DSRC) or any other protocol for data exchange. In addition to the communication of telematics data described herein, vehicles may exchange communications when executing autonomous driving functions, passing along detected information (e.g., traffic or road conditions), or communicating messages from driver to driver.

The network 450 may be a local area network (LAN), a wide area network (WAN), a cellular network, the Internet, or a combination thereof, and may connect the collection vehicle 402 to one or more computing devices, including one or more servers from different service providers. Each of the one or more servers may be connected to one or more databases. A service provider may provide navigational map, weather and/or traffic data to the collection vehicle 402.

The memory 406 is connected to the ECU 404 and may be connected to any other component of the collection vehicle 402. The memory 406 is configured to store any data described herein, such as its own telematics data (e.g., the sensor data detected by the sensors 408) or any telematics data received via the transceiver 410 from other vehicles. The memory 406 may also store a copy of the distributed ledger where the user data and/or vehicle data is recorded.

The system 400 also includes the standard vehicle 422. The standard vehicle 422 includes an ECU 424 similar to ECU 404, a memory 426 similar to memory 406, sensors 428 similar to sensors 408, and a transceiver 430 similar to transceiver 410. The standard vehicle 422 is substantially similar to the collection vehicle 402 aside from the standard vehicle's communicating with the network 450. The standard vehicle 422 may not be configured to communicate with the network 450 and may only communicate with other vehicles. That is, the primary difference between the collection vehicle 402 and the standard vehicle 422 is the transceiver 410 of the collection vehicle is configured to communicate with the network 450 and other vehicles, whereas the transceiver 430 of the standard vehicle 422 is configured to communicate with other vehicles. In addition, the ECU 404 of the collection vehicle 402 may be configured in a different manner than the ECU 424 of the standard vehicle 422 in order to perform the additional functionality of the collection vehicle 402 described herein.

As used herein, a "unit" may refer to hardware components, such as one or more computer processors, controllers, or computing devices configured to execute instructions stored in a non-transitory memory.

Figure 5A:
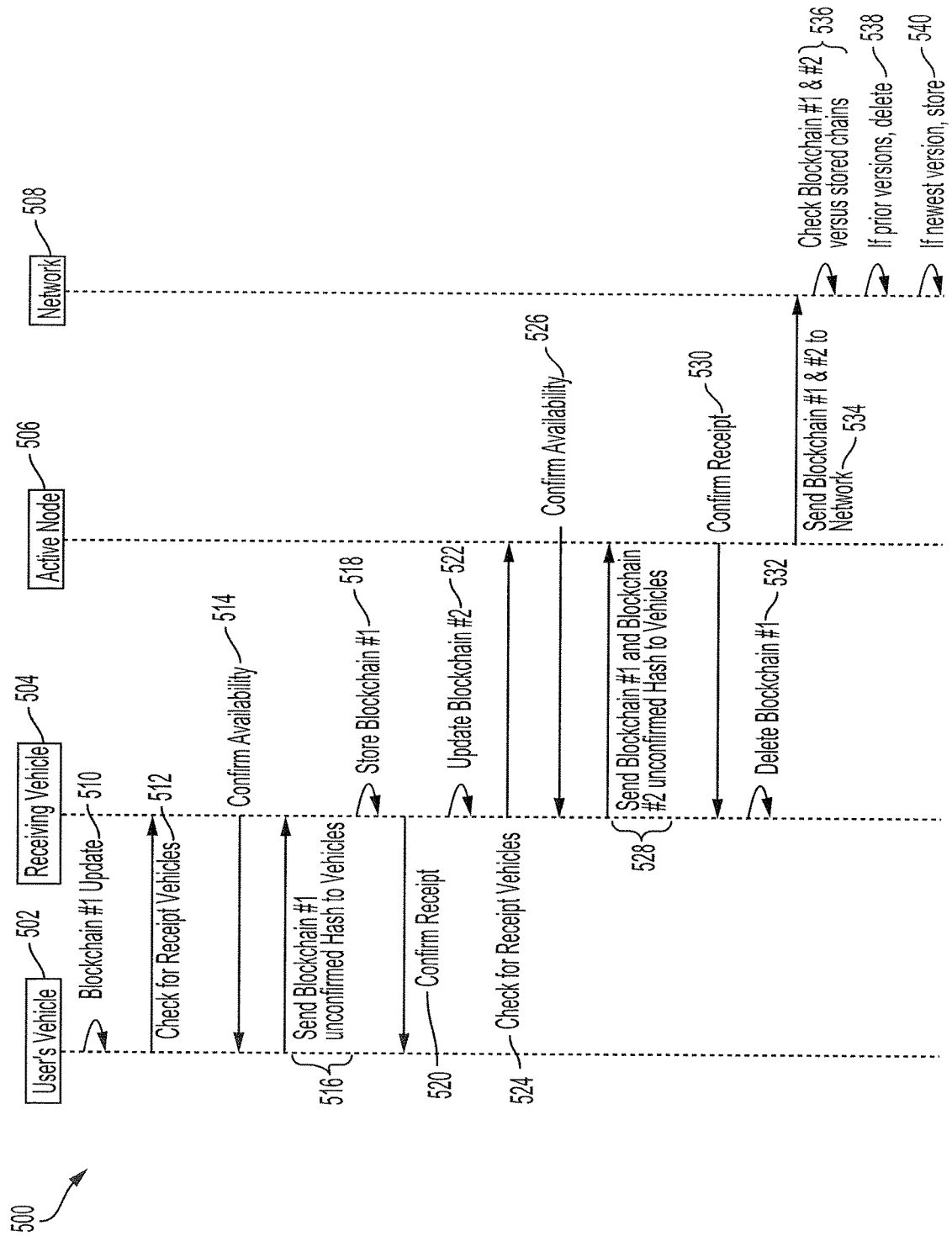
FIGS. 5A-5B illustrate a sequence diagram of various components of the system, according to various embodiments of the invention.
Figure 5B:
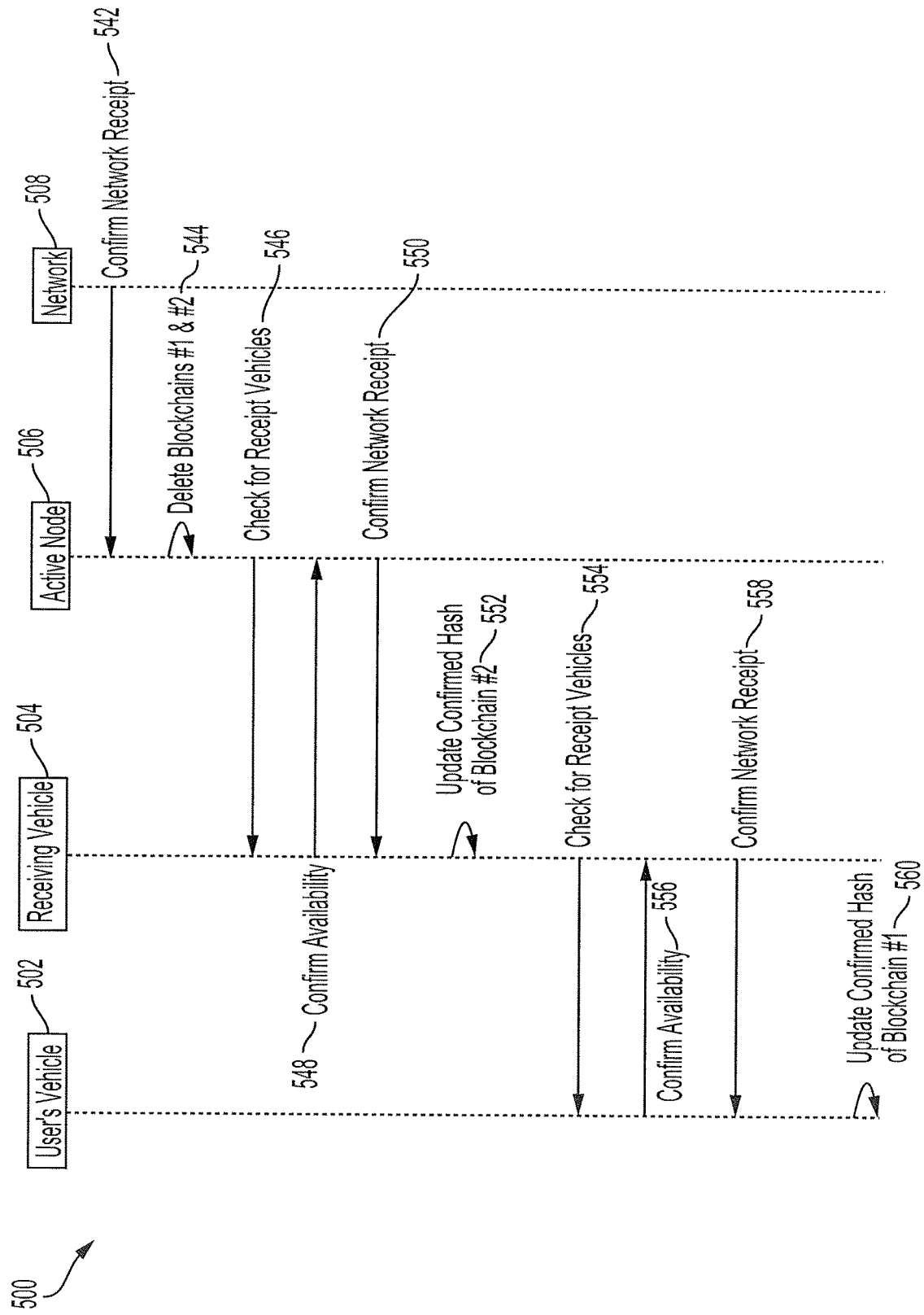

FIG. 5 illustrates a sequence diagram 500 of interactions between various components of the systems described herein.

The sequence diagram 500 includes a user's vehicle 502, a receiving vehicle 504, an active node 506, and a network 508. The user's vehicle 502 may be a standard vehicle (e.g., standard vehicles 306-314 or standard vehicle 422). The receiving vehicle 504 may also be a standard vehicle. The active node 506 may be a collection vehicle (e.g., collection vehicles 302-304 or collection vehicle 402).

In some embodiments, the active node 506 may be capable of changing between active and inactive modes. When in the active mode, the active node 506 acts as a collection vehicle does, as described herein. When in inactive mode, the active node 506 acts as a standard vehicle does, as described herein. The active node 506 may be compensated for acting as a collection vehicle in active mode, and the active node 506 may include a mechanism to detect a duration in time and transmitted data that the active node 506 acts in active mode as a collection vehicle and in inactive mode as a standard vehicle. The network 508 is similar to the networks (e.g., network 108, 350, 450) described herein.

The user's vehicle 502 detects telematics data based on one or more sensors and updates a first blockchain (step 510). The first blockchain may be stored locally on a memory (e.g., memory 426) of the user's vehicle 502. The user's vehicle 502 checks for receipt vehicles to send the updated first blockchain to (step 512). In some embodiments, the user's vehicle 502 broadcasts a signal for other vehicles, and the signal may include a request to send telematics data.

The receiving vehicle 504 determines whether it has sufficient storage space in memory (e.g., memory 426) to receive any additional telematics data. When the receiving vehicle 504 determines that it has sufficient storage space, it communicates an indication to the user's vehicle 502 that the receiving vehicle 504 is able to receive the telematics data from the user's vehicle 502 (step 514).

The user's vehicle 502 communicates the first blockchain to the receiving vehicle 504 (step 516). In addition, a hash of the first blockchain is also sent to the receiving vehicle 504. The hash of the first blockchain may serve as a receipt which may later be confirmed once the telematics data of the user's vehicle 502 is uploaded to the network 508. In this way, the user's vehicle 502 may be made aware of when its telematic data has been uploaded. In addition, because the hash is based on the contents of the first blockchain, based on the confirmation later received, the user's vehicle 502 may be made aware of what telematics data has been uploaded to the network 508. For example, at a first time, the user's vehicle 502 may communicate a first version of the first blockchain to a first receiving vehicle. The hash of this first version of the first blockchain may be 5dm36bw. At a second time after more telematics data has been detected, the user's vehicle 502 may communicate a second version of the first blockchain to a second receiving vehicle. The hash of this second version of the first blockchain may be ck22mk27. At a later time, when the user's vehicle 502 receives a confirmation that the telematics data associated with 5dm36bw has been uploaded, the user's vehicle 502 may be aware that the telematics data detected after the first version of the blockchain has not been uploaded to the network yet.

The receiving vehicle 504 receives the first blockchain and stores the first blockchain in memory (step 518). The receiving vehicle 504 communicates a receipt confirmation to the user's vehicle 502 (step 520). The receiving vehicle 504 may detect telematics data of its own and update a second blockchain associated with the receiving vehicle 504 (step 522). The receiving vehicle 504 then checks for other receiving vehicles (step 524).

The active node 506 receives the request from the receiving vehicle 504 to send telematics data, and the active node 506 checks whether it can receive the telematics data. In some embodiments, the signal sent from the receiving vehicle 504 includes a size of the telematics data to be sent, and the active node 506 checks its memory (e.g., memory 406) to determine whether it can accommodate the telematics data from the receiving vehicle 504. When the active node 506 is able to accommodate the telematics data from the receiving vehicle 504, the active node 506 communicates a confirmatory signal to the receiving vehicle 504 (step 526).

The receiving vehicle 504 communicates the first blockchain, the second blockchain, and hashes of each of the first blockchain and second blockchain to the active node 506 (step 528). The active node 506 confirms receipt of the first blockchain and the second blockchain to the receiving vehicle 504 (step 530). The receiving vehicle 504 deletes the first blockchain (step 532). Since the first blockchain, which corresponds to the user's vehicle 502, has been passed on to the active node 506, the receiving vehicle 504 no longer needs to store it in its memory. By removing blockchains which have already been passed on to another vehicle, the capacity to facilitate telematics data transmission to the network 508 is improved, as the receiving vehicle 504 has now freed up storage space in memory for other blockchains of other vehicles. The receiving vehicle 504 does not delete the second blockchain because the second blockchain is associated with the receiving vehicle 504.

The active node 506 communicates the first blockchain and the second blockchain to the network 508 (step 534). In some embodiments, the active node 506 communicates the first blockchain and the second blockchain via a mobile data connection. In other embodiments, the active node 506 collects blockchains of telematics data until it reaches a location where a connection to the network 508 may be cheaper, faster, and/or more reliable, such as a home or work.

The received first blockchain and second blockchain are compared with previous stored versions (step 536), and if they are older than the previous stored versions the received first blockchain and second blockchain are deleted (step 538) and if they are newer than the previous stored versions, the received first blockchain and second blockchain are stored (step 540). In some embodiments, a copy of the first blockchain is stored in a remote data server and another copy of the first blockchain is maintained by the user's vehicle. Similarly, a copy of the second blockchain may be stored in the remote data server and another copy of the second blockchain is maintained by the receiving vehicle 504. In this way, multiple versions of the blockchain are stored in a distributed manner, and they may be checked against each other to determine validity.

The active node 506 receives a confirmation of receipt from the network (step 542). The active node 506 deletes the first blockchain and the second blockchain from memory to make room for newer blockchains of telematics data (step 544). The active node 506 checks for receiving vehicles to receive the network receipt confirmation of the first blockchain and the second blockchain (step 546). The receiving vehicle 504 checks for availability and confirms availability to receive network receipt confirmation data from the active node 506 (step 548). The active node 506 communicates the network receipt confirmation of the first blockchain and the second blockchain (step 550). In some embodiments, the network receipt confirmation is an indication that a blockchain having a particular hash value has been received by the network 508.

The receiving vehicle 504 updates the confirmed hash of the second blockchain based on the received confirmation of the first blockchain and the second blockchain (step 552). The receiving vehicle 504 checks for other receiving vehicles to receive the network receipt confirmation of the first blockchain (step 554). The user's vehicle 502 checks for availability and confirms availability to receive network receipt confirmation data from the receiving vehicle 504 (step 556). The receiving vehicle 504 communicates the network receipt confirmation of the first blockchain (step 585). In some embodiments, the network receipt confirmation is an indication that a blockchain having a particular hash value has been received by the network 508.

The user's vehicle 502 updates the confirmed hash of the first blockchain based on the received confirmation of the first blockchain (step 560). In some embodiments, the network receipts may be passed on from vehicle to vehicle in a similar manner as the blockchains are passed on from vehicle to vehicle until they reach their intended destination. In this way, the communication of data may be asynchronous, and the checks for whether the received blockchain is the most recent version in step 540 is critical.

Figure 6A:
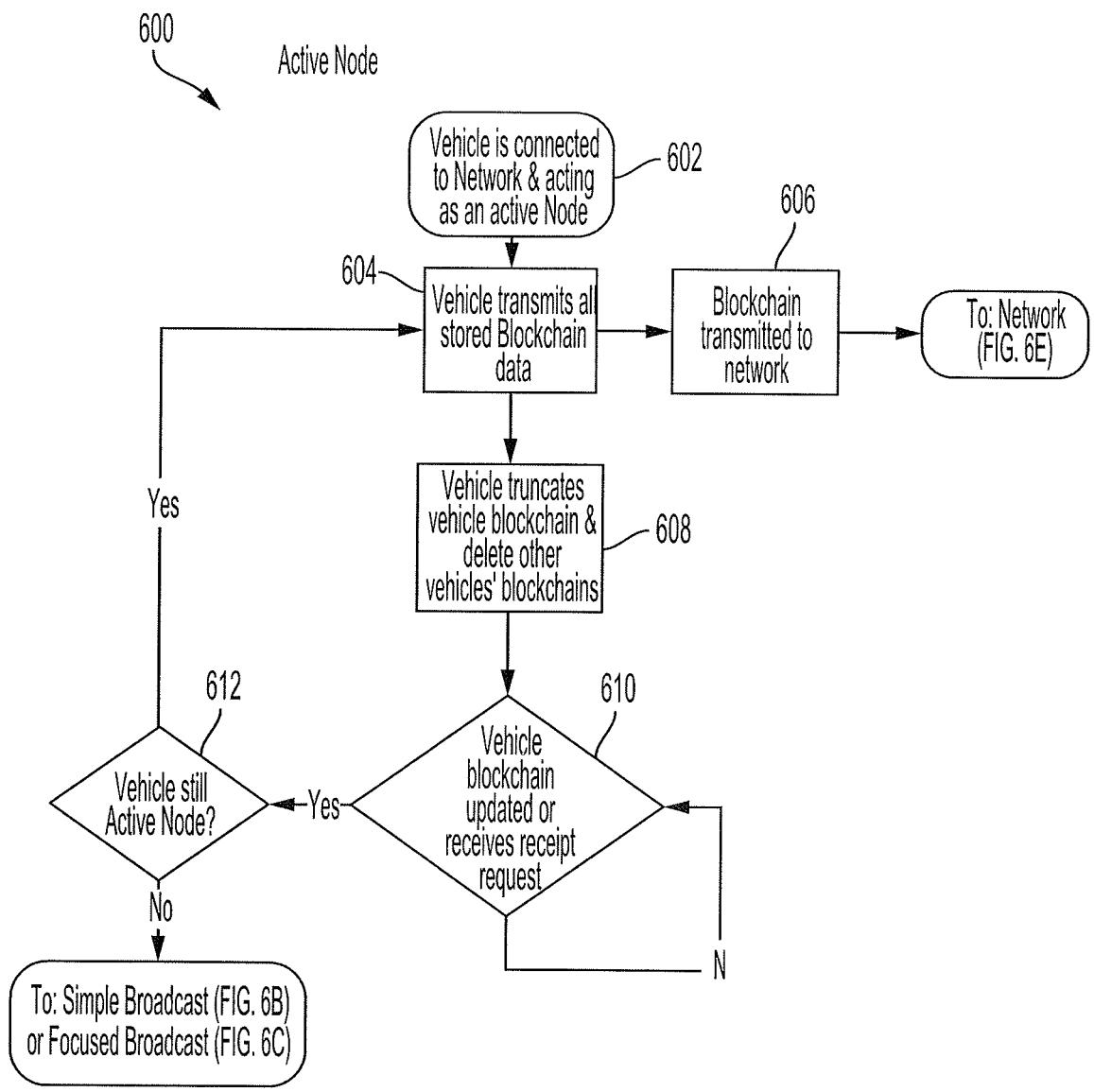
FIGS. 6A-6F illustrate a flow diagram of various processes and interactions performed by the system, according to various embodiments of the invention.

FIG. 6A illustrates an operation flow of an active node (e.g., active node 506). The vehicle (e.g., collection vehicles 302-304 or collection vehicle 402) is connected to a network (e.g., network 108, 350, 450, 508) and is acting in active mode (step 602). The vehicle transmits all stored blockchain data (step 604). The stored blockchain data may include one or more blockchains from one or more respective other vehicles, and the blockchain data may include telematics data from the respective other vehicles. The blockchain data is transmitted to the network (step 606), which leads to FIG. 5E.

The vehicle also truncates the vehicle's own blockchain and deletes other vehicles' blockchains (step 608). This step is performed to create storage space in memory (e.g., memory 406) for more telematics data and/or other blockchains of telematics data from other vehicles.

The vehicle determines whether the vehicle's own blockchain is updated with newly detected telematics data or whether the vehicle receives a receipt request from another vehicle (step 610). When the vehicle's own blockchain is updated with newly detected telematics data or when the vehicle receives a receipt request from another vehicle, the vehicle determines whether it is an active node (step 612). When the vehicle is an active node, the process returns to step 604. Otherwise, the vehicle will search for receiving vehicles (e.g., receiving vehicle 504) to pass on the vehicle's own blockchain update or any blockchain received from another vehicle. Thus, the process proceeds to FIG. 6B when the broadcast for other vehicles is a simple broadcast or FIG. 6C when the broadcast is a focused broadcast. Whether the broadcast is a simple broadcast or a focused broadcast may be adjusted by the user of the vehicle, the vehicle manufacturer, or any party with an interest in the telematics data.

Figure 6B:
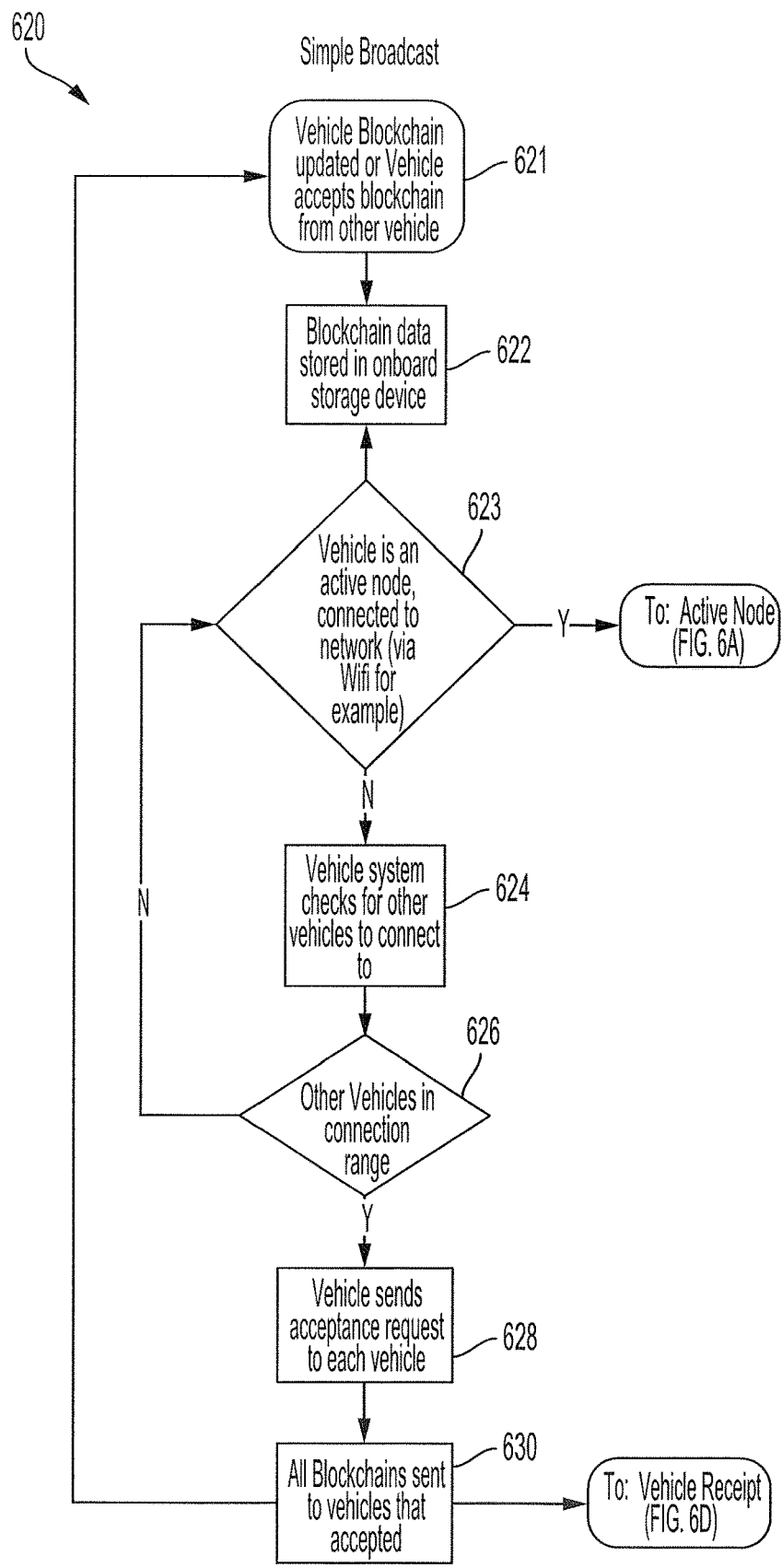

In the process 620 shown in FIG. 6B, the vehicle has an update to its own blockchain or has received another vehicle's blockchain (step 621). The vehicle's own blockchain and the received blockchain from the other vehicle is stored onboard the vehicle in a storage device (e.g., memory 406) (step 622). The vehicle determines whether it is in active mode and connected to a network (step 623). If the vehicle is in active mode and connected to a network, the process returns to FIG. 6A. If the vehicle is not in active mode, the vehicle acts as a receiving vehicle (e.g., receiving vehicle 504) and the vehicle checks for other vehicles to connect to (step 624).

The vehicle determines whether other vehicles are in range (step 626). When there are no vehicles in range, the process 620 returns to step 623. When there are vehicles in range, the vehicle sends an acceptance request to all of the vehicles in range (step 628). When any of the vehicles in range communicate back an acceptance for offloading telematics data, all of the blockchains in the vehicle's memory are sent to the accepting vehicles (step 630). The process 620 returns to step 621 and also proceeds to FIG. 6D.

Figure 6C:
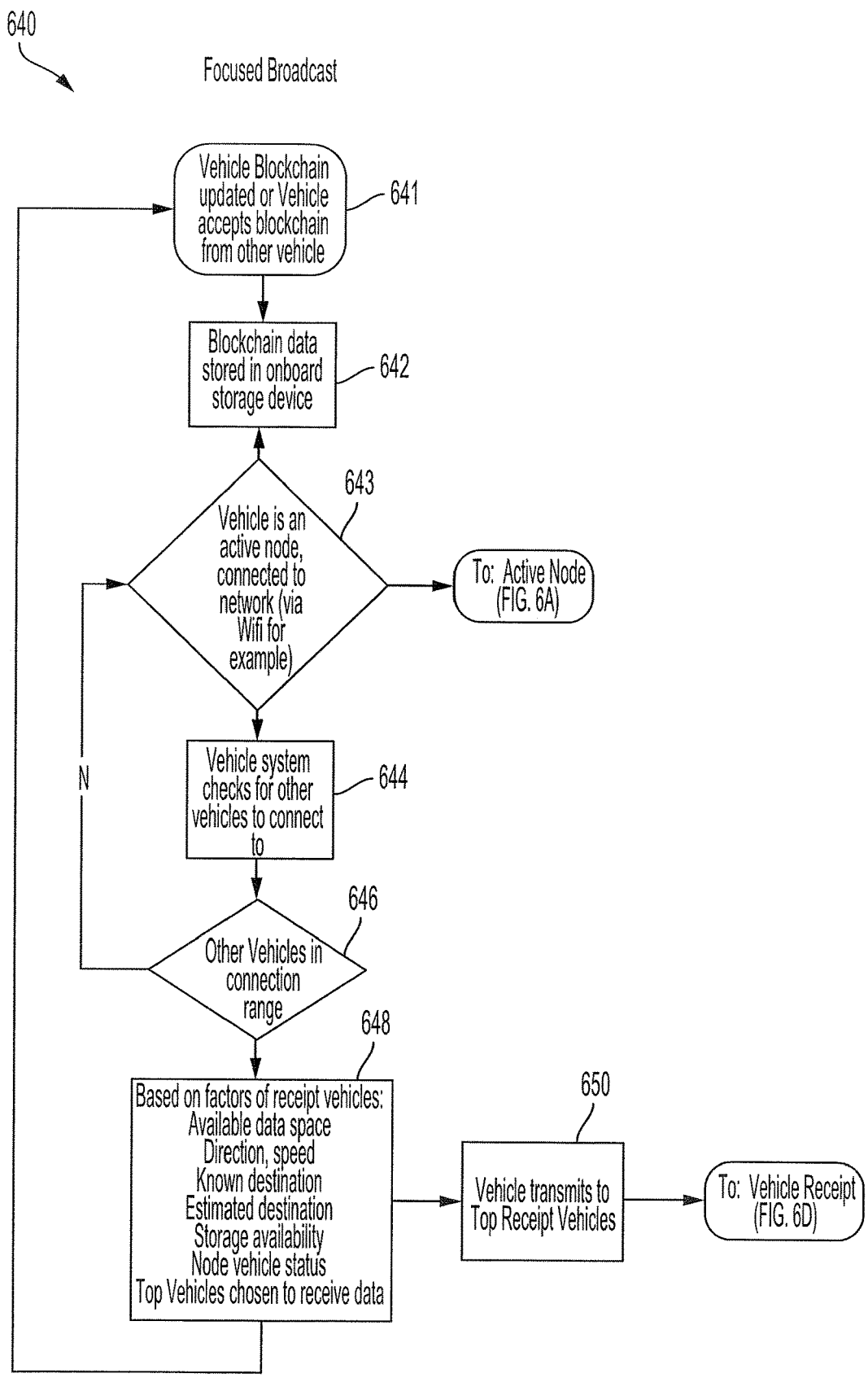

Alternatively to the process 620 of FIG. 6B, when the vehicle has an update to its own blockchain or has received another vehicle's blockchain, the vehicle may perform a focused broadcast for particular vehicles to offload the blockchain(s) to. FIG. 6C illustrates the focused broadcast in process 640.

The vehicle has an update to its own blockchain or has received another vehicle's blockchain (step 641). The vehicle's own blockchain and/or the received blockchain from the other vehicle is stored in a local storage device (step 642). The vehicle determines if it is in active mode and connected to the network (step 643). When the vehicle is in active mode, the process 640 proceeds to FIG. 6A. When the vehicle is not in active mode, the vehicle checks for other vehicles to connect to (step 644). The vehicle determines whether other vehicles are in range (step 646). The vehicle may communicate a request to offload telematics data to other vehicles.

Any vehicles in range may communicate an acceptance for offloading telematics data. In the acceptance communication, the potential receiving vehicles may indicate various receipt factors, such as available data space, direction of travel, speed of travel, any known destination (e.g., destination entered into navigation unit by driver), an estimated destination when there is no known destination, or whether the potential receiving vehicle is an active node, for example. By taking these factors into account, the uploading of the telematics data to the network may be made more efficient.

The vehicle may not communicate the vehicle's own blockchain and/or any other vehicles' blockchains to the potential receiving vehicle when the potential receiving vehicle's available storage space is below the data size of the vehicle's own blockchain and/or any other vehicles' blockchains. The vehicle may not communicate the vehicle's own blockchain and/or any other vehicles' blockchains when the potential receiving vehicle is travelling at a speed and direction such that the two vehicles are not in proximity long enough for the data transfer to occur between the two vehicles. The vehicle may not communicate the vehicle's own blockchain and/or any other vehicles' blockchains when the potential receiving vehicle is travelling to a known or estimated destination such that the two vehicles will likely not be in proximity long enough for the data transfer to occur between the two vehicles. The vehicle may not communicate the vehicle's own blockchain and/or any other vehicles' blockchains when the potential receiving vehicle is not an active node if the vehicle values expedient uploading of the vehicle's own blockchain and/or any other vehicles' blockchains.

One or more potential receiving vehicles are chosen to receive the vehicle's own blockchain and/or any other vehicles' blockchains (step 648), and the vehicle transmits the vehicle's own blockchain and/or any other vehicles' blockchains (step 650). The process 640 then proceeds to FIG. 6D.

Figure 6D:
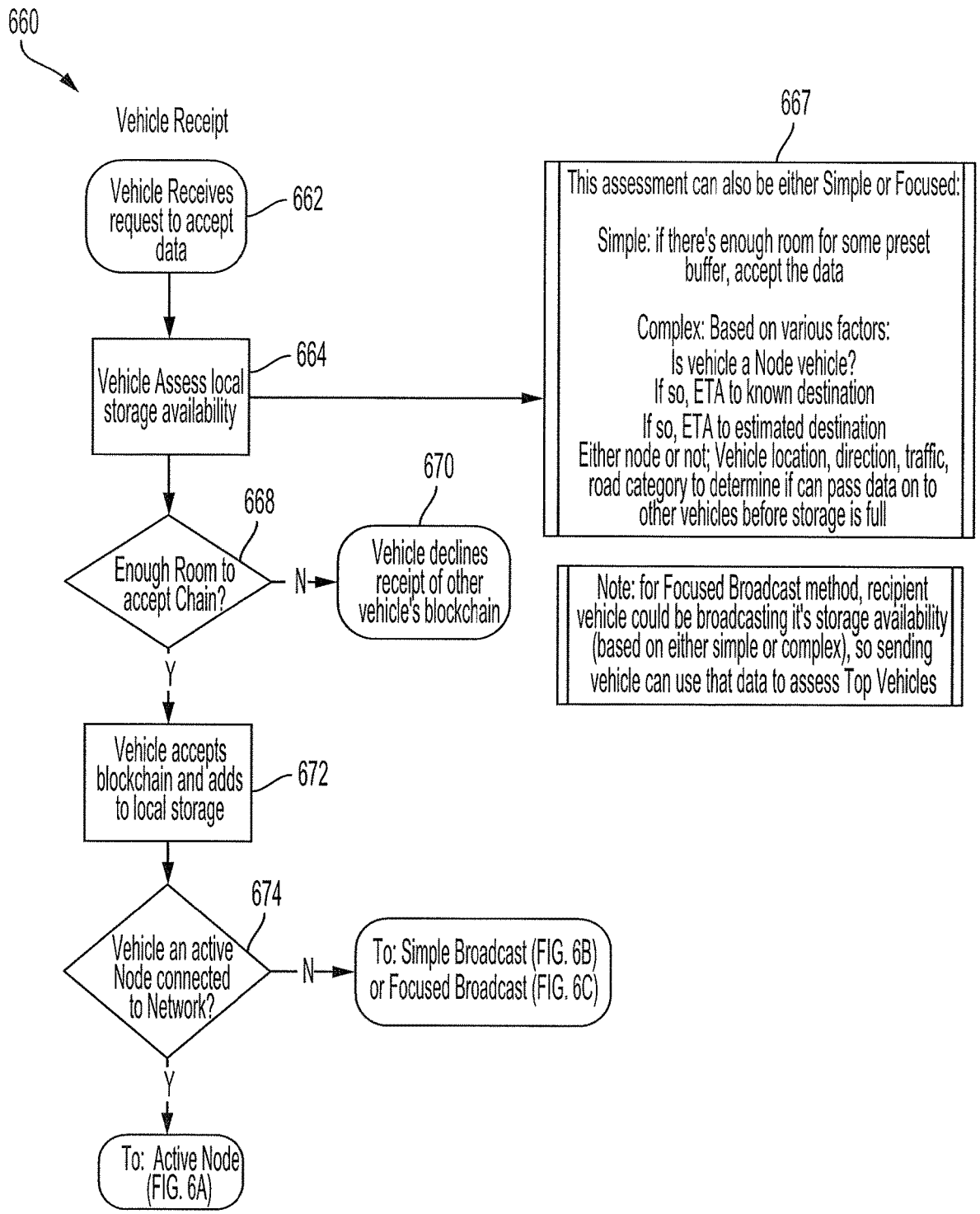

Once the receiving vehicle has received a request to receive one or more blockchains of telematics data, the process 660 of FIG. 6D may be executed. The receiving vehicle receives a request to accept data (step 662).

The receiving vehicle assesses its local storage availability (step 664). The assessment may be as simple as determining whether the available room exceeds a threshold availability buffer. The assessment may also be more detailed to include whether the receiving vehicle is operating as a node vehicle, and if so the estimated time of arrival to a known or estimated destination where all received blockchains of telematics data may be uploaded to the network. The assessment may also include consideration of the receiving vehicle's location, direction of travel, traffic, and road type to determine whether the receiving data can pass on any received data to other vehicles before the receiving vehicle's storage is full (step 667).

The receiving vehicle determines whether it has enough storage space to accept the blockchain(s) (step 668). When there is not enough storage space, the receiving vehicle communicates a declination of receipt to the other vehicle (step 670). When there is sufficient storage space, the receiving vehicle accepts the blockchain(s) and adds the received blockchain(s) to local storage, alongside the receiving vehicle's own telematics blockchain.

The receiving vehicle determines whether it is an active node and connected to a network (step 674). When the receiving vehicle is not an active node, the process 660 proceeds to FIG. 6B or 6C. When the receiving vehicle is an active node, the process 660 proceeds to FIG. 6A.

Figure 6E:
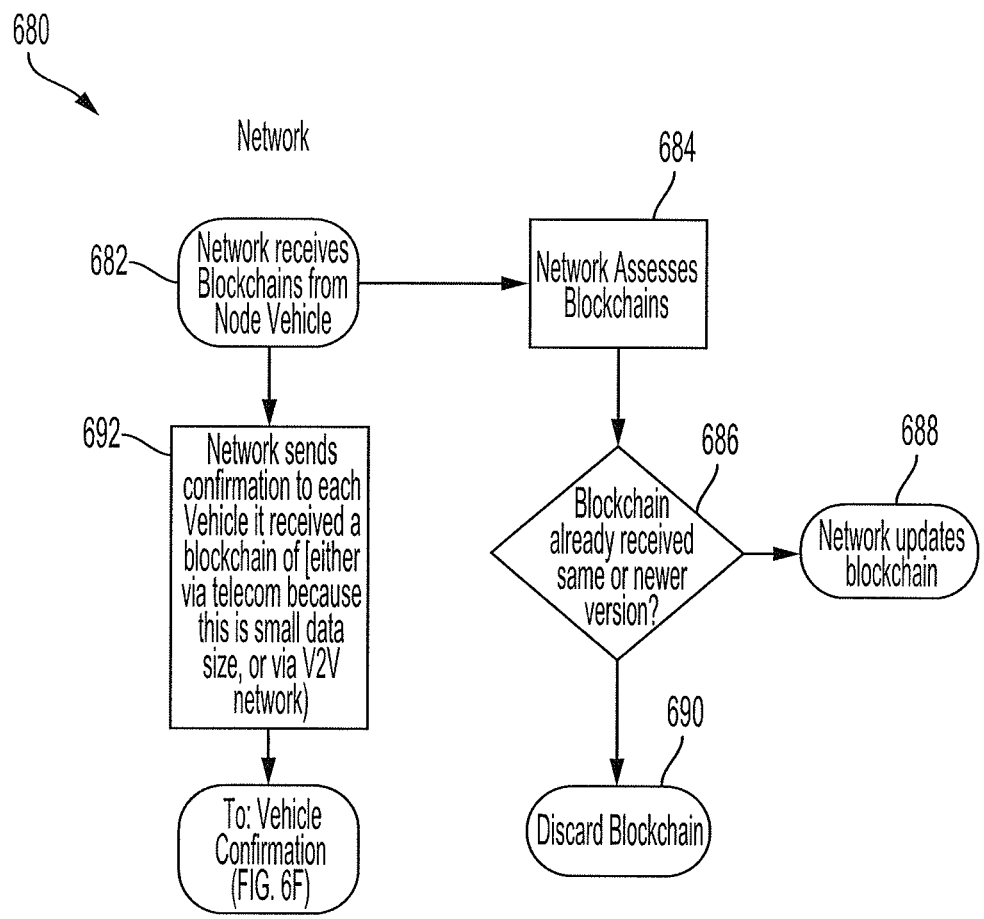

FIG. 6E illustrates a process 680 performed at the network (e.g., network 108, 350, 450). The process 680 may be performed by one or more computing device having a processor and memory connected to the network. In some embodiments, the performance of the process 680 may be executed by multiple computing devices in a distributed manner to increase trust of the results and to improve computational efficiency. The network receives one or more blockchains of telematics data from a node vehicle (step 682). The network assesses each of the received blockchains (step 684). The network determines whether the received blockchain has already been received or if it is a newer version (step 686). In some embodiments, a hash of the blockchain data may be an efficient way to determine if the blockchain was already received. When the received blockchain is a newer version, the network updates the blockchain (step 688). When the received blockchain is not a newer version (i.e., an older version or the currently stored version), the network discards the blockchain (step 690).

The network also sends a confirmatory communication to each vehicle it received a blockchain for (step 692). This confirmatory communication may be sent directly to the vehicle using cellular communications or the confirmatory communication may be sent via vehicle to vehicle communication until it reaches the respective vehicle. In some embodiments, the network is aware of a communications address for each vehicle so that the confirmatory communication may be sent directly. The vehicles may be identified based on identification information stored in their respective blockchains. The process 680 proceeds to FIG. 6F.

Figure 6F:
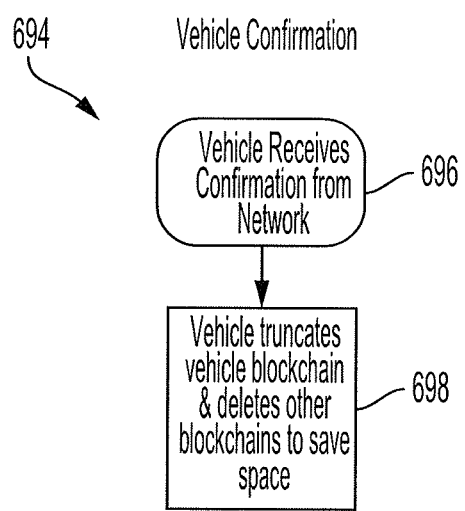

FIG. 6F illustrates a process 694 for each vehicle (e.g., a standard vehicle or a collection vehicle). The vehicle receives a confirmation from the network (step 696) and the vehicle truncates the vehicle's own blockchain and deletes other blockchains to make storage space for future vehicle telematics data and received blockchains of other vehicle telematics data (step 698).

Figure 7:
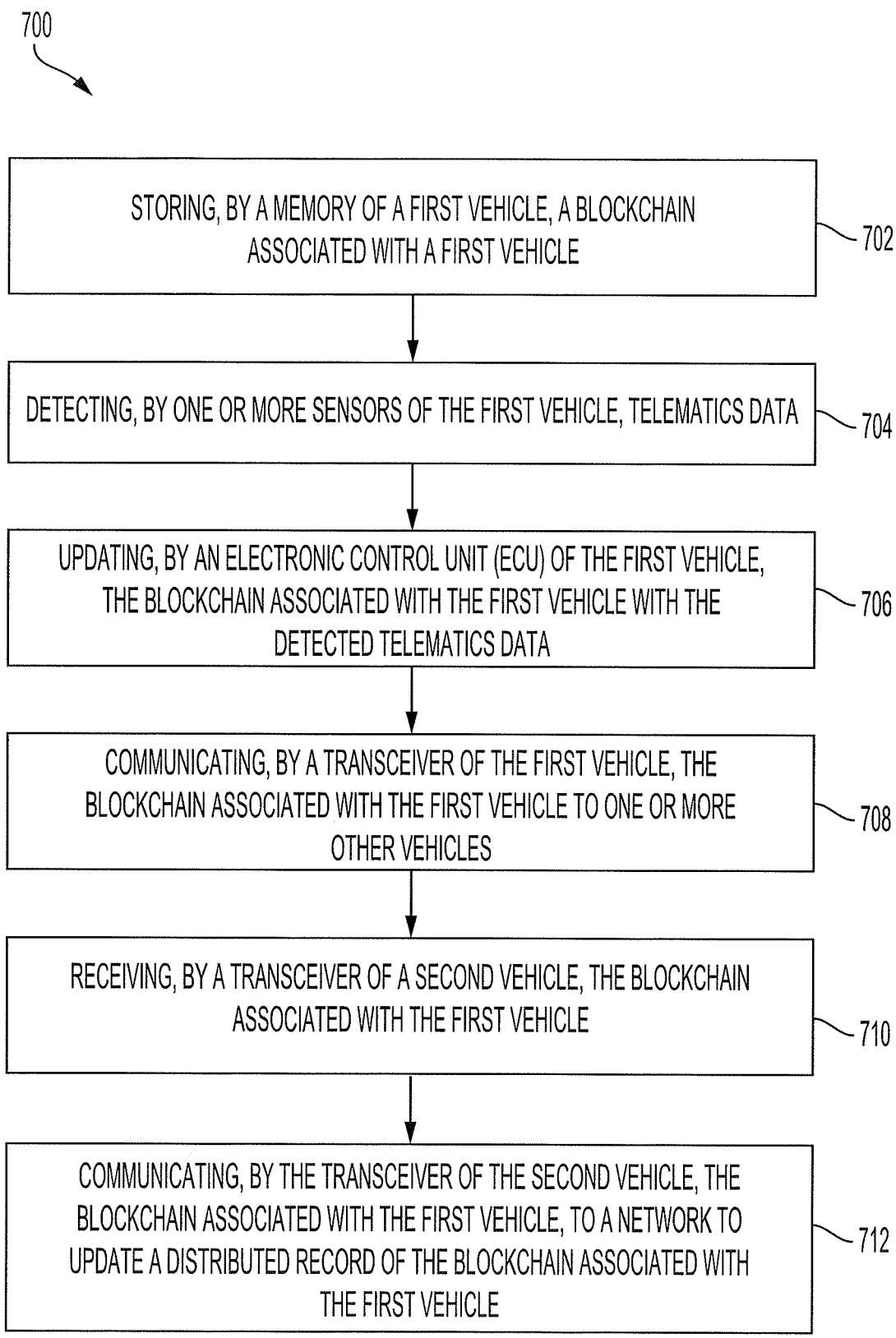
FIG. 7 illustrates a flow diagram of a process performed by the system, according to various embodiments of the invention.

FIG. 7 illustrates a process 700 of maintaining telematics data. A memory (e.g., memory 426) of a first vehicle (e.g., standard vehicles 306-314 or standard vehicle 422) stores a blockchain associated with the first vehicle (step 702). The blockchain may be an immutable record of data associated with the first vehicle, such as owner data, registration data, any transaction data, and any telematics data.

One or more sensors (e.g., sensors 428) of the first vehicle detect telematics data (step 704). The one or more sensors may include a location sensor, a fuel sensor, an image sensor, a speed sensor, an accelerator pedal sensor, a brake pedal sensor, an IMU, a steering wheel sensor, a seat belt sensor, or an airbag sensor, each configured to detect respective data, as described herein.

An ECU (e.g., ECU 424) of the first vehicle updates the blockchain associated with the first vehicle with the detected telematics data (step 706). The ECU may modify a block of the blockchain or may create a new block with the detected telematics data.

A transceiver (e.g., transceiver 430) of the first vehicle communicates the blockchain associated with the first vehicle to one or more other vehicles (step 708). In some embodiments, requests and acceptances for communicating blockchains are exchanged between the first vehicle and the one or more other vehicles prior to the communication of the blockchains, as described herein. If the first vehicle currently has other blockchains of other vehicles stored in its memory, those blockchains may be communicated as well.

A transceiver (e.g., transceiver 410) of a second vehicle (e.g., collection vehicles 302-304 or collection vehicle 402) receives the blockchain associated with the first vehicle from the transceiver of the first vehicle (step 710). The second vehicle may also receive the blockchains of other vehicles from the first vehicle, and the second vehicle may store all blockchains received from the first vehicle in storage (e.g., memory 406).

The transceiver of the second vehicle communicates the blockchain associated with the first vehicle to a network (e.g., network 450) to update a distributed record of the blockchain associated with the first vehicle (step 712). In some embodiments, the communication to the network is performed using a mobile or cellular data connection. In some embodiments, the communication to the network is performed when the second vehicle is located at a base location where data transfer is faster and/or more cost-effective.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for maintaining telematics data, the system comprising:
   a standard vehicle including:
      one or more sensors configured to detect telematics data,
      a memory configured to store a blockchain associated with the standard vehicle and store one or more received blockchains from one or more other vehicles,
      an electronic control unit (ECU) configured to update the blockchain associated with the standard vehicle with the detected telematics data and delete, from the memory, the stored one or more received blockchains from the one or more other vehicles upon the one or more received blockchains from the one or more other vehicles being communicated to a collection vehicle, and
      a transceiver configured to communicate the blockchain to the one or more other vehicles, receive the one or more blockchains from the one or more other vehicles, and communicate the one or more received blockchains to the collection vehicle along with the blockchain associated with the collection vehicle;
   wherein the collection vehicle has a transceiver configured to receive the blockchain from the standard vehicle, and communicate the blockchain from the standard vehicle to a network to update a distributed record of the blockchain associated with the standard vehicle.

2. The system of claim 1, wherein the collection vehicle further comprises:
   one or more sensors configured to detect telematics data,
   a memory configured to store a blockchain associated with the collection vehicle,
   an ECU configured to update the blockchain associated with the collection vehicle with the detected telematics data, and
   wherein the transceiver is further configured to communicate the blockchain associated with the collection vehicle to the network.

3. The system of claim 1, wherein the collection vehicle is further configured to communicate a confirmation receipt for each blockchain received from the standard vehicle.

4. The system of claim 1, wherein the collection vehicle communicates the blockchain from the standard vehicle to the network via a cellular data connection.

5. The system of claim 1, wherein the collection vehicle communicates the blockchain from the standard vehicle to the network via a Wi-Fi connection.

6. A vehicle for collecting telematics data, the vehicle comprising:
   one or more sensors configured to detect telematics data;
   a memory configured to store a blockchain associated with the vehicle and store received blockchain from another vehicle:
   an electronic control unit (ECU) configured to update the blockchain associated with the vehicle with the detected telematics data and delete, from the memory, the stored received blockchain from the other vehicle upon the received blockchain being communicated to a network; and
   a transceiver configured to receive the blockchain from the other vehicle and communicate the blockchain from the vehicle and the received blockchain to the network to update a distributed record of the blockchain associated with the vehicle and a distributed record of the received blockchain.

7. The vehicle of claim 6, wherein the received blockchain from the other vehicle includes telematics data detected by one or more sensors of the other vehicle.

8. The vehicle of claim 6, wherein the transceiver is further configured to communicate a confirmation receipt to the other vehicle upon receiving the blockchain from the other vehicle.

9. The vehicle of claim 6, wherein the transceiver communicates blockchain from the vehicle and the received blockchain to the network via a cellular data connection.

10. The system of claim 6, wherein the transceiver communicates blockchain from the vehicle and the received blockchain to the network via a Wi-Fi connection.

11. A method for maintaining telematics data, the method comprising:
   storing, by a memory of a first vehicle, a blockchain associated with the first vehicle;
   detecting, by one or more sensors of the first vehicle, telematics data;
   updating, by an electronic control unit (ECU) of the first vehicle, the blockchain associated with the first vehicle with the detected telematics data;
   communicating, by a transceiver of the first vehicle, the blockchain associated with the first vehicle to one or more other vehicles;
   receiving, by a transceiver of a second vehicle, the blockchain associated with the first vehicle;
   communicating, by the transceiver of the second vehicle, the blockchain associated with the first vehicle, to a network to update a distributed record of the blockchain associated with the first vehicle;
   receiving, by the transceiver of the first vehicle, one or more blockchains from one or more other vehicles;
   storing, by the memory of the first vehicle, the received one or more blockchains from the one or more other vehicles;
   communicating, by the transceiver of the first vehicle, the received one or more blockchains from the one or more other vehicles, to the second vehicle; and
   deleting, from the memory of the first vehicle, the stored one or more received blockchains from the one or more other vehicles upon the one or more received blockchains from the one or more other vehicles being communicated to the second vehicle.

12. The method of claim 11, further comprising:
   storing, by a memory of the second vehicle, a blockchain associated with the second vehicle;
   detecting, by one or more sensors of the second vehicle, telematics data;
   updating, by an electronic control unit (ECU) of the second vehicle, the blockchain associated with the second vehicle with the detected telematics data; and
   communicating, by the transceiver of the second vehicle, the blockchain associated with the second vehicle, to the network to update the distributed record of the blockchain associated with the second vehicle.

13. The method of claim 11, further comprising communicating, by the transceiver of the second vehicle, a confirmation receipt for each blockchain received from the first vehicle.

14. The system of claim 11, wherein the communicating, by the transceiver of the second vehicle to the network is performed via a cellular data connection or a Wi-Fi connection.

* * * * *